United States Patent
Lee

(10) Patent No.: US 10,400,095 B2
(45) Date of Patent: Sep. 3, 2019

(54) RUBBER COMPOSITION FOR INJECTION MOLDING

(71) Applicant: Fine Chemical Co., Ltd., Gimhae-si (KR)

(72) Inventor: Sung Yull Lee, Busan (KR)

(73) Assignee: FINE CHEMICAL CO., LTD., Gimhae-si (KR)

( * ) Notice: Subject to any disclaimer, the term of this patent is extended or adjusted under 35 U.S.C. 154(b) by 45 days.

(21) Appl. No.: 15/570,345

(22) PCT Filed: Jul. 1, 2016

(86) PCT No.: PCT/KR2016/007124
§ 371 (c)(1),
(2) Date: Oct. 29, 2017

(87) PCT Pub. No.: WO2017/010714
PCT Pub. Date: Jan. 19, 2017

(65) Prior Publication Data
US 2018/0142092 A1    May 24, 2018

(30) Foreign Application Priority Data
Jul. 13, 2015  (KR) .................. 10-2015-0099296

(51) Int. Cl.
| C08L 23/08 | (2006.01) |
| C08K 3/00 | (2018.01) |
| C08K 5/00 | (2006.01) |
| C08L 23/16 | (2006.01) |
| C08L 7/00 | (2006.01) |
| C08L 23/04 | (2006.01) |
| C08L 9/06 | (2006.01) |

(52) U.S. Cl.
CPC .............. *C08L 23/08* (2013.01); *C08K 3/00* (2013.01); *C08K 5/00* (2013.01); *C08L 7/00* (2013.01); *C08L 23/04* (2013.01); *C08L 23/16* (2013.01); *C08L 9/06* (2013.01); *C08L 2205/03* (2013.01); *C08L 2207/32* (2013.01)

(58) Field of Classification Search
CPC .. C08L 23/16; C08L 23/08; C08L 7/00; C08L 23/04; C08L 9/06; C08L 2205/03; C08L 2207/32; C08K 3/00; C08K 5/00
See application file for complete search history.

(56) References Cited

U.S. PATENT DOCUMENTS

| 5,807,914 A * | 9/1998 | Obayashi et al. ........ C08K 7/14 428/34.4 |
| 6,399,710 B1 | 6/2002 | Finerman et al. |
| 6,639,003 B2 | 10/2003 | Borsinger |
| 2003/0069346 A1* | 4/2003 | Borsinger et al. ........ B60C 1/00 524/487 |
| 2005/0020755 A1* | 1/2005 | Berta ...................... C08L 23/04 524/487 |
| 2010/0227976 A1 | 9/2010 | Nakano |

FOREIGN PATENT DOCUMENTS

| EP | 1148095 A1 | 10/2001 |
| JP | 05-078531 A | 3/1993 |
| JP | 1993-295214 A | 11/1993 |
| JP | H10279750 A | 10/1998 |
| JP | 2001288332 A | 10/2001 |
| JP | 2002302588 A | 10/2002 |
| JP | 2003007313 A | 1/2003 |
| JP | 2011256374 A | 12/2011 |
| KR | 1019990031240 A | 2/2001 |
| KR | 1020000014880 A | 11/2001 |
| KR | 1020020077801 A | 6/2004 |
| KR | 1020087002399 A | 4/2008 |
| KR | 1020120093427 A | 6/2013 |

OTHER PUBLICATIONS

European Search Report of 16 624 631.2, dated Sep. 20, 2018.
International Search Report of PCT/KR2016/007124, dated Nov. 1, 2016, English Translation.
Office action from Japan Patent Office, dated Aug. 28, 2018.

* cited by examiner

*Primary Examiner* — Nathan M Nutter
(74) *Attorney, Agent, or Firm* — STIP Law Group, LLC

(57) ABSTRACT

Provided is a rubber composition for injection molding. The rubber composition includes a rubber component selected from a natural rubber or a synthetic rubber and an ethylene oligomer. The ethylene oligomer is an ethylene homo-oligomer or an ethylene co-oligomer. The ethylene oligomer has a melting point of 130° C. or less, as determined by differential scanning calorimetry (DSC), and a weight average molecular weight of 40,000 or less, a number average molecular weight of 15,000 or less or a viscosity average molecular weight of 15,000 or less.

9 Claims, No Drawings

RUBBER COMPOSITION FOR INJECTION MOLDING

CROSS-REFERENCE TO RELATED APPLICATIONS

This application is the U.S. National Phase under 35 U.S.C. § 371 of International Application No. PCT/KR2016/007124 filed on Jul. 1, 2016, which in turn claims the benefit of Korean Application No. 10-2015-0099296, filed on Jul. 13, 2015, the disclosures of which are incorporated by reference into the present application.

TECHNICAL FIELD

The present disclosure relates to a rubber composition for injection molding.

BACKGROUND ART

Rubbers, such as packings for automotive, marine, and machine parts, and molded rubber products, such as tires and shoe soles, are indispensable to our daily life. Molded rubber products are currently used in many applications where elasticity is required but have the disadvantage of poor processability. Conventional methods for manufacturing molded rubber products include a series of time-consuming processes: rubber mastication→chemical mixing-→cooling→heat input→sheeting→aging→cutting→press molding→trimming. Such methods have the disadvantage that the raw material tends to be lost during the processes. For example, the occurrence of flash during the press process is responsible for the loss of 5-10% of the raw material.

Press molding limits the design of molded rubber products because parting lines of the mold should remain only on the top and bottom of the products and the release of the products is possible only when the opening and closing sides of the mold are equal to or larger than the other portions of the mold, so that the mold can be demolded.

In an attempt to overcome this limitation, injection molding has long been applied in the rubber industry. However, injection molding still has problems in terms of processing despite no need for rubber sheet cutting, press molding, and trimming. That is, injection molding includes upstream processes before cutting, i.e. rubber mastication→chemical mixing→cooling→heat input→sheeting. Thereafter, the resulting rubber sheet is produced in the form of strips, which are fed into a hopper of an injection molding machine. The reason for the additional process for the production of the rubber sheet in the form of strips is that the rubber compound has low hardness and high surface tackiness, and as a result, its pellets are very difficult to feed into the hopper, unlike plastics. A process for dusting the surface of the strips is further needed to remove the tackiness of the strips, making the procedure cumbersome. Further, dust is produced in the workplace during the dusting process, resulting in an extremely poor working environment. Moreover, many voids between the strips make the transport of the strips troublesome and uneconomical.

In the case where the rubber compound is in the form of pellets instead of strips, the raw material is free to move, enabling the development of efficient machines, such as multi-station injection molding machines. Thus, pellets of rubber compounds for injection molding have been investigated in various fields due to their advantages. For example, Korean Patent Publication No. 10-2004-0050165 (entitled "Pellet-type rubber composition for shoe outsole, method for preparing the rubber composition and method for manufacturing shoe outsole") proposes a composition including a base material, a filler, a coupling agent, a crosslinking agent, and a co-crosslinking agent wherein the base material is composed of 60 to 90 parts by weight of a rubber and 10 to 40 parts by weight of a thermoplastic resin. This composition is excellent in mechanical strength and various physical properties but has extremely poor flowability, requiring very high injection pressure, extremely high moldability, and the use of an expensive injection molding machine.

These requirements contradict the primary purpose of pursuing efficiency of the equipment. Further, the flow of the composition does not reach the fine portions of the mold, making it difficult to manufacture molded products with attractive appearance. This difficulty can be solved by mixing a softener, such as process oil, with the composition. In this case, however, the outer surface of the pellets becomes tacky, causing aggregation of the pellets. This also contradicts the purpose of the invention.

DETAILED DESCRIPTION OF THE INVENTION

Means for Solving the Problems

According to one aspect of the present invention, there is provided a rubber composition for injection molding including a rubber component selected from a natural rubber or a synthetic rubber and an ethylene oligomer wherein the ethylene oligomer is an ethylene homo-oligomer or an ethylene co-oligomer, has a melting point of 130° C. or less, as determined by differential scanning calorimetry (DSC), and has a weight average molecular weight of 40,000 or less, a number average molecular weight of 15,000 or less or a viscosity average molecular weight of 15,000 or less.

According to a further aspect of the present invention, there is provided a pellet for injection molding produced by extrusion of the rubber composition.

According to another aspect of the present invention, there is provided a method for injection molding, including: providing a rubber composition for injection molding including a rubber component selected from a natural rubber or a synthetic rubber and an ethylene oligomer; mixing the rubber composition with a shear force; extruding the rubber composition into pellets; feeding the pellets into a hopper of an injection molding machine equipped with a mold and subjecting the pellets to injection molding; and releasing the resulting molded product from the mold.

As used herein, the term "oligomer" is defined as a low molecular weight polymer consisting of relatively small repeating units. Specifically, the oligomer refers to a polymer that has a weight average molecular weight of 40,000 or less, a number average molecular weight of 15,000 or less or a viscosity average molecular weight of 15,000 or less and consists of tens to thousands of repeating units.

MODE FOR CARRYING OUT THE INVENTION

The present disclosure will now be described in more detail.

A rubber composition according to one embodiment of the present invention includes a rubber component selected from a natural rubber or a synthetic rubber and an ethylene oligomer, such as an ethylene homo-oligomer or an ethylene co-oligomer.

The natural rubber may be a general natural rubber or a modified natural rubber. The general natural rubber may be any of those known in the art. No particular limitation is imposed on the specification (e.g., the place of origin) of the general natural rubber. The natural rubber is polyisoprene and includes cis-1,4-polyisoprene as a major component. Alternatively, the natural rubber may also include trans-1,4-polyisoprene depending on what characteristics are required. For example, the natural rubber may be balata, which is a latex obtained from trees of the Sapotaceae family indigenous to South America. Balata includes trans-1,4-polyisoprene as a major component. The modified natural rubber refers to a rubber produced by modifying or purifying the general natural rubber. As the modified natural rubber, there may be exemplified epoxidized natural rubber (ENR), deproteinized natural rubber (DPNR) or hydrogenated natural rubber.

The synthetic rubber may be selected from the group consisting of styrene butadiene rubber (SBR), modified styrene butadiene rubber, butadiene rubber (BR), modified butadiene rubber, chlorosulfonated polyethylene rubber, epichlorohydrin rubber, fluorine rubber, silicone rubber, nitrile rubber, hydrogenated nitrile rubber, nitrile butadiene rubber (NBR), modified nitrile butadiene rubber, chlorinated polyethylene rubber, styrene butadiene styrene (SBS) rubber, styrene ethylene butylene styrene (SEBS) rubber, styrene isoprene styrene (SIS) rubber, ethylene propylene rubber, ethylene propylene diene (EPDM) rubber, hypalon rubber, chloroprene rubber, ethylene vinyl acetate rubber, acrylic rubber, hydrin rubber, vinylbenzyl chloride styrene butadiene rubber, bromomethyl styrene butyl rubber, maleated styrene butadiene rubber, carboxylated styrene butadiene rubber, epoxy isoprene rubber, maleated ethylene propylene rubber, carboxylate nitrile butadiene rubber, brominated polyisobutyl isoprene-co-paramethyl styrene (BIMS) rubber, and combinations thereof.

The ethylene oligomer improves the flowability of the composition when blended with the rubber component and serves to ensure excellent physical properties of the composition when vulcanized by a cross-linking agent.

The ethylene oligomer has a melting point of 130° C. or less, preferably 120° C. or less, more preferably 100° C. or less, as determined by differential scanning calorimetry (DSC). When the rubber composition passes through a cylinder at an internal temperature exceeding 130° C. upon injection molding, its temperature may be raised to 150° C. or more by friction with the cylinder wall, causing scorching of a cross-linking agent. It is thus preferred to limit the molding temperature to 130° C. or less. If the ethylene oligomer has a melting point exceeding 130° C., it is not melted in a cylinder whose temperature is maintained at 130° C. or less. It is thus preferred that the ethylene oligomer has a melting point not higher than 130° C.

Preferably, the ethylene oligomer has a melting point of at least 50° C., which is suitable for injection molding. If the melting point of the ethylene oligomer is lower than 50° C., a final rubber product may be deformed or contracted depending on changes in the external environment due to the low heat resistance of the ethylene oligomer.

The ethylene oligomer may have a weight average molecular weight of 1,000 to 40,000, preferably 5,000 to 30,000, a number average molecular weight of 1,000 to 15,000, preferably 3,000 to 10,000, or a viscosity average molecular weight of 1,000 to 15,000, preferably 3,000 to 10,000. If the molecular weight of the ethylene oligomer is less than the lower limit defined above, the ethylene oligomer is almost a liquid phase, rendering the surface of the final composition tacky. Meanwhile, if the molecular weight of the ethylene oligomer exceeds the upper limit defined above, the composition is rendered less flowable, making its injection molding difficult.

The ethylene homo-oligomer is a polymer consisting of only an ethylene monomer. The ethylene co-oligomer may be a co-oligomer of i) ethylene and ii) at least one ethylenically unsaturated monomer selected from the group consisting of $C_3$-$C_{10}$ α-olefins, $C_1$-$C_{12}$ alkyl esters of $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids or an ionomer thereof.

Specific examples of such ethylene co-oligomers include ethylene vinyl acetate (EVA) co-oligomers, ethylene butyl acrylate (EBA) co-oligomers, ethylene methyl acrylate (EMA) co-oligomers, ethylene ethyl acrylate (EEA) co-oligomers, ethylene methyl methacrylate (EMMA) co-oligomers, ethylene butene (EB) co-oligomers, and ethylene octene (EO-Co) co-oligomers.

Preferably, ethylene accounts for a major mole fraction of the co-oligomer. Specifically, ethylene accounts for about 50 mole % or more of the co-oligomer. More preferably, ethylene accounts for about 60 mole % or more, about 70 mole % or more or about 80 mole % or more of the co-oligomer.

The ethylene co-oligomer is preferably a co-oligomer of ethylene and an α-olefin. A co-oligomer of ethylene and vinyl acetate is particularly preferred in terms of availability and cost.

The rubber component is present in an amount of 35 to 85 parts by weight, preferably 40 to 80 parts by weight per 100 parts by weight of the sum of the rubber component and the ethylene oligomer. The ethylene oligomer is present in an amount of 15 to 65 parts by weight, preferably 20 to 60 parts by weight, based on 100 parts by weight of the composition. If the content of the ethylene oligomer in the composition is less than the lower limit defined above, the surface of pellets may become tacky on the pellet surface and the injection molding workability of the composition may be unsatisfactory. Meanwhile, if the content of the ethylene oligomer in the composition exceeds the upper limit defined above, the tensile strength and rebound resilience of the composition may deteriorate.

The rubber composition of the present invention may include a cross-linking agent. The cross-linking agent may be sulfur, a sulfur compound or an organic peroxide that can impart high-temperature viscoelasticity to resins. The cross-linking agent is preferably an organic peroxide that can cross-link the ethylene oligomer to ensure sufficient strength. The cross-linking agent is used in an amount of 0.02 to 4 parts by weight, preferably 0.02 to 3.0 parts by weight, more preferably 0.05 to 1.5 parts by weight per 100 parts by weight of the sum of the rubber component and the ethylene oligomer. The cross-linking agent has a 1 minute half-life temperature of 130 to 180° C. The use of the cross-linking agent in an amount of less than 0.02 parts by weight may lead to insufficient cross-linking, making it difficult to expect sufficient physical properties. Meanwhile, the use of the cross-linking agent in an amount exceeding 1.5 parts by weight may lead to excessive cross-linking, resulting in a dramatic increase in hardness and low tearing strength.

The sulfur compound may be, for example, sulfur dichloride, morpholine disulfide, polysulfide, tetramethylthiuram disulfide, selenium dimethyl dithiocarbamate or 2-(4'-morpholinodithio)benzothiazole.

The organic peroxide may be, for example, t-butylperoxyisopropyl carbonate, t-butyl peroxylaurylate, t-butyl peroxyacetate, di-t-butyl peroxyphthalate, t-dibutyl peroxy maleic acid, cyclohexanone peroxide, t-butylcumyl peroxide, t-butyl hydroperoxide, t-butyl peroxybenzoate, dicumyl peroxide, 1,3-bis(t-butylperoxyisopropyl)benzene, methyl ethyl ketone peroxide, 2,5-dimethyl-2,5-di(benzoyloxy) hexane, 2,5-dimethyl-2,5-di(t-butylperoxy)hexane, di-t-butyl peroxide, 2,5-dimethyl-2,5-(t-butylperoxy)-3-hexane, n-butyl-4,4-bis(t-butylperoxy)valerate or α,α'-bis(t-butylperoxy)diisopropylbenzene.

The composition may include a filler that reduces the production cost of the composition or serves to enhance the physical properties of the composition. Examples of such fillers include silica ($SiO_2$), $MgCO_3$, $CaCO_3$, carbon black, talc, $Al(OH)_3$, and $Mg(OH)_2$. The filler is typically used in an amount of 5 to 50 parts by weight per 100 parts by weight of the sum of the rubber component and the ethylene oligomer. The use of the filler in an amount of less than the lower limit defined above has little or no effect in enhancing the physical properties of the composition. Meanwhile, the use of the filler in an amount exceeding the lower limit defined above increases the viscosity of the composition, leading to poor injection molding processability and high hardness.

The composition may further include a lubricant, such as stearic acid or ethylene bisstearamide, to improve the workability of the final mixture. The lubricant may be used in an amount of 0.1 to 5 parts by weight per 100 parts by weight of the sum of the rubber component and the ethylene oligomer. If the lubricant is used in an amount of less than the lower limit defined above, the composition tends to adhere to a processing machine, and as a result, immense frictional heat is produced, causing scorching of the cross-linking agent. Meanwhile, if the lubricant is used in an amount exceeding the upper limit defined above, the composition tends to be very slippery, resulting in poor injection molding processability.

In some embodiments, the composition may optionally include a small amount of an ethylene copolymer. The ethylene copolymer may serve as a compatibilizer between the rubber and the ethylene oligomer depending on the kind of the co-monomer.

Specific examples of suitable ethylene copolymers include ethylene vinyl acetate (EVA) copolymers, ethylene butyl acrylate (EBA) copolymers, ethylene methyl acrylate (EMA) copolymers, ethylene ethyl acrylate (EEA) copolymers, ethylene methyl methacrylate (EMMA) copolymers, ethylene butene (EB) copolymers, and ethylene octene (EO) copolymers. The ethylene copolymer is used in such a small amount that it can serve as a compatibilizer while maintaining the injection moldability of the composition. For example, the ethylene copolymer may be used in an amount of 2 to 10 parts by weight per 100 parts by weight of the sum of the rubber component and the ethylene oligomer.

In some embodiments, the compatibilizer, such as an ethylene vinyl acetate copolymer, prevents the physical properties of the composition from deterioration when the ethylene homo-oligomer having a low compatibility with the rubber is used. Furthermore, the compatibilizer can be used to improve the physical properties of the composition.

According to one embodiment of the present invention, the rubber composition has a melt index (MI, 120° C.) of at least 2.0 g/10 min, preferably at least 3.0 g/10 min. If the melt index of the rubber composition is less than the lower limit defined above, the composition is rendered less flowable, causing its poor injection molding workability. However, when it is desired to prevent the formation of weld lines and flash, the MI (120° C., 5 kg) of the composition may be not higher than 30 g/10 min.

The presence of the oligomeric ethylene compound in the rubber composition improves the flowability of the rubber composition during injection molding, which ensures improved processability of the composition, and eliminates the need to use a softener, such as process oil, which solves the problem that the outer surface of pellets of the rubber composition becomes tacky.

A further aspect of the present invention provides pellets for injection molding produced by extrusion of the rubber composition. For example, the rubber composition may be pelletized by underwater cutting. In this case, the tackiness of the rubber composition is removed due to the oligomer component blended with the rubber, facilitating pelletization of the rubber composition with sharp cut sides. The pellets thus produced are very suitable for injection molding due to their good flowability, as described above.

Another aspect of the present invention provides a rubber composition including a rubber component selected from a natural rubber or a synthetic rubber and an ethylene oligomer. The ethylene oligomer is an ethylene homo-oligomer or an ethylene co-oligomer, has a melting point of 130° C. or less, as determined by differential scanning calorimetry (DSC), and has a weight average molecular weight of 1,000 to 40,000, a number average molecular weight of 1,000 to 15,000 or a viscosity average molecular weight of 1,000 to 15,000. The rubber composition can be easily used to produce pellets whose surface is not tacky, thus being suitable for use not only in subsequent injection molding but also in other processes, including press molding.

Yet another aspect of the present invention provides a method for injection molding by using the rubber composition. According to the method of the present invention, a rubber composition for injection molding is first provided. The rubber composition includes a rubber component selected from a natural rubber or a synthetic rubber and an ethylene oligomer. The ethylene oligomer is an ethylene homo-oligomer or an ethylene co-oligomer. The ethylene oligomer has a melting point of 130° C. or less, as determined by differential scanning calorimetry (DSC), and a weight average molecular weight of 40,000 or less, a number average molecular weight of 15,000 or less or a viscosity average molecular weight of 15,000 or less. The composition may include one or more additives selected from fillers, cross-linking agents, and lubricants.

Next, the rubber composition is mixed with a shear force. A kneader is generally used to mix the rubber composition. The temperature of the kneader is preferably not lower than the softening point of the rubber component and at least the melting point of the ethylene oligomer. The temperature of the kneader is not higher than the 1 minute half-life temperature of a cross-linking agent, usually 110° C. or less, preferably 130° C. or less at which scorching of the cross-linking agent is not encountered. Taking into consideration the above conditions, the temperature of the kneader can be set to 80 to 100° C.

Next, the rubber composition is extruded into pellets. Specifically, the rubber composition is pelletized by face cutting during extrusion in a cylinder at about 100 to about 120° C.

Subsequently, the pellets are fed into a hopper of an injection molding machine equipped with a mold and are subjected to injection molding. The mold is usually heated to a temperature of 150 to 200° C. After the injection molding, the resulting molded product is released from the mold.

The pellets of the rubber composition are suitable for injection molding due to their good flowability.

The present invention will be specifically explained with reference to the following examples. However, these examples are not intended to limit the scope and spirit of the invention.

EXAMPLES

Rubber-1: NBR35L (Kumho Petrochemical)
Rubber-2: KEP020P (Kumho Polychem)
Oligomer-1: Acryft CM5021 (EMMA, Sumitomo Chemical Co. Ltd., weight average molecular weight: 38,000, melting point: 68° C.)
Oligomer-2: A-C400 (EVA, Honeywell, weight average molecular weight: 14,400, melting point: 92° C.)
Oligomer-3: A-0575P (LMPE, Honeywell, weight average molecular weight: 7,100, melting point: 106° C.)
Oligomer-4: L-C 124N (LMPE, Lion Chemtech Co. Ltd., viscosity average molecular weight: 3,000, melting point: 132° C.)
Polymer-1: Engage 8237 (Ethylene-Octene Copolymer, DOW, weight average molecular weight: 45,000, melting point: 65° C.)

The rubbers, the oligomers or the polymer, and various additives were mixed in the amounts shown in Table 1 in a kneader. Each of the mixtures was extruded in a cylinder at 100° C. and pelletized using an under-water pelletizer. The pellets were injection molded from a mold (170° C.) of an injection molding machine at a cylinder temperature of 120° C. 5 min after injection molding, the pellets were released from the mold to obtain rubber composition specimens having dimensions of 100 mm×200 mm×5 mm. The specimens were used for the tests shown in Table 1.

TABLE 1

Test results of the rubber oligomer compositions for injection molding

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Rubber-1 | 100 | | 100 | 60 | 60 | 60 | 60 | 40 |
| Rubber-2 | | 100 | | | | | | |
| Polymer-1 | | | | 40 | 40 | 40 | 40 | 60 |
| Oligomer-1 | | | | | | | | |
| Oligomer-2 | | | | | | | | |
| Oligomer-3 | | | | | | | | |
| Oligomer-4 | | | | | | | | |
| ZnO | 5.0 | 5.0 | 5.0 | 5.0 | 5.0 | 5.0 | 5.0 | 5.0 |
| Stearic acid | 1.0 | 1.0 | 1.0 | 1.0 | 1.0 | 1.0 | 1.0 | 1.0 |
| Carbon black HAF | 30 | 30 | 30 | 30 | 10 | 10 | 10 | 10 |
| Process oil | | | 10 | | | 5 | 10 | 10 |
| Dicumyl peroxide | 2.0 | 2.0 | 2.0 | 2.0 | 2.0 | 2.0 | 2.0 | 2.0 |
| Pelletizability | Poor | Poor | Fair | Good | Good | Good | Good | Good |
| Pellet surface tackiness | Poor | Poor | Poor | Good | Good | Fair | Poor | Fair |
| MI (120° C., 5 kg), g/10 min | 0 | 0 | 0 | 0 | 0.2 | 1.0 | 3.0 | 5.0 |
| Injection molding workability | Poor | Poor | Poor | Poor | Poor | Poor | Good | Good |
| Hardness, Shore A | | | | 80 | 60 | 55 | 50 | 60 |
| Tensile strength, kg/cm² | | | | 150 | 160 | 100 | 60 | 80 |
| Elongation, % | | | | 300 | 400 | 500 | 500 | 500 |
| Rebound resilience, % | | | | 25 | 30 | 30 | 30 | 18 |
| Rubber Suitability for injection molding | Unsuitable | Unsuitable | Unsuitable | Unsuitable | Unsuitable | Unsuitable | Unsuitable | Unsuitable |

| | Ex. 1 | Ex. 2 | Ex. 3 | Comp. Ex. 9 | Comp. Ex. 10 | Ex. 4 | Comp. Ex. 11 | Ex. 5 | Comp. Ex. 12 |
|---|---|---|---|---|---|---|---|---|---|
| Rubber-1 | 60 | 60 | | | | 80 | 90 | 40 | 30 |
| Rubber-2 | | | 60 | 60 | 60 | | | | |
| Polymer-1 | | | | | | | | | |
| Oligomer-1 | 40 | | | | | | | | |
| Oligomer-2 | | 40 | | | | 20 | 10 | 60 | 70 |
| Oligomer-3 | | | 40 | | | | | | |
| Oligomer-4 | | | | 40 | 40 | | | | |
| ZnO | 5.0 | 5.0 | 5.0 | 5.0 | 5.0 | 5.0 | 5.0 | 5.0 | 5.0 |
| Stearic acid | 1.0 | 1.0 | 1.0 | 1.0 | 1.0 | 1.0 | 1.0 | 1.0 | 1.0 |
| Carbon black HAF | 30 | 30 | 30 | 30 | 10 | 30 | 30 | 30 | 30 |
| Process oil | | | | | 10 | | | | |
| Dicumyl peroxide | 2.0 | 2.0 | 2.0 | 2.0 | 2.0 | 2.0 | 2.0 | 2.0 | 2.0 |
| Pelletizability | Good | Good | Good | Good | Good | Good | Good | Good | Good |
| Pellet surface tackiness | Good | Good | Good | Good | Fair | Good | Poor | Good | Good |
| MI (120° C., 5 kg), g/10 min | 3.0 | 5.0 | 5.0 | 0 | 0 | 3.0 | 1.0 | 10.0 | 17 |
| Injection molding workability | Good | Good | Good | Poor | Poor | Good | Poor | Good | Good |
| Hardness, Shore A | 65 | 60 | 65 | | | 60 | | 65 | 67 |
| Tensile strength, kg/cm² | 120 | 100 | 120 | | | 100 | | 70 | 30 |

TABLE 1-continued

Test results of the rubber oligomer compositions for injection molding

| | | | | | | | | |
|---|---|---|---|---|---|---|---|---|
| Elongation, % | 500 | 500 | 500 | | | 600 | | 400 | 400 |
| Rebound resilience, % | 30 | 35 | 35 | | | 40 | | 25 | 18 |
| Rubber Suitability for injection molding | Suitable | Suitable | Suitable | Unsuitable | Unsuitable | Suitable | Unsuitable | Suitable | Unsuitable |

1) Pelletizability was evaluated depending on whether the cutting sides were sharp when the compositions were pelletized by underwater cutting.
2) Pellet surface tackiness was evaluated as follows. First, 100 g of pellets were placed in a cotton bag and put into an oven at 40° C. The pellets were pushed down with a 1 kg weight. After 24 h, a visual observation was made as to whether the pellets aggregated.
3) Injection molding workability was evaluated by melt index (MI, 120° C., 5 kg) because injection molding was impossible to perform at ≥130° C. where the cross-linking agent was scorched. When the specimen was judged to be "good" when the melt index (MI, 120° C., 5 kg) was ≥3.0 g/10 min and "poor" when the MI was <3.0 g/10 min.
4) The specimen was evaluated to be suitable for injection molding when its Shore A hardness was ≤75, its tensile strength was ≥60 kg/cm$^2$, and its rebound resilience was ≥20%.

As can be seen from the results in Table 1, the compositions of Examples 1-5, each of which was prepared by blending the rubber component with the ethylene oligomer, were excellent in pelletizability, pellet surface tackiness, injection molding workability, elongation, and rebound resilience. These results can lead to the conclusion that the compositions of Examples 1-5 are very suitable for injection molding.

The invention claimed is:

1. A rubber composition for injection molding comprising a rubber component selected from a natural rubber or a synthetic rubber and an ethylene co-oligomer, has a melting point of 130° C. or less, as determined by differential scanning calorimetry (DSC), and has a weight average molecular weight of 40,000 or less, a number average molecular weight of 15,000 or less or a viscosity average molecular weight of 15,000 or less,
wherein the ethylene co-oligomer is a co-oligomer of i) ethylene and ii) at least one ethylenically unsaturated monomer selected from the group consisting of $C_1$-$C_{12}$ alkylesters of $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinylesters of saturated $C_2$-$C_{18}$ carboxylic acids or an ionomer thereof.

2. The rubber composition according to claim 1, wherein the rubber component and the ethylene oligomer are present in amounts of 35 to 85 parts by weight and 15 to 65 parts by weight, respectively, per 100 parts by weight of the sum of the rubber component and the ethylene oligomer.

3. The rubber composition according to claim 2, further comprising one or more fillers selected from the group consisting of silica ($SiO_2$), $MgCO_3$, $CaCO_3$, carbon black, talc, $Al(OH)_3$, and $Mg(OH)_2$.

4. The rubber composition according to claim 2, further comprising 0.02 to 4 parts by weight of a cross-linking agent.

5. The rubber composition according to claim 2, further comprising 0.1 to 5 parts by weight of a lubricant.

6. The rubber composition according to claim 1, wherein the composition has a melt index (120° C., 2.16 kg) of at least 2.0 g/10 min.

7. A pellet for injection molding produced by extrusion of the rubber composition according to claim 1.

8. A method for injection molding, comprising: providing a rubber composition for injection molding comprising a rubber component selected from a natural rubber or a synthetic rubber and an ethylene oligomer; mixing the rubber composition with a shear force; extruding the rubber composition into pellets; feeding the pellets into a hopper of an injection molding machine equipped with a mold and subjecting the pellets to injection molding; and releasing the resulting molded product from the mold.

9. The method according to claim 8, wherein the ethylene oligomer is an ethylene homo-oligomer or an ethylene co-oligomer, has a melting point of 130° C. or less, as determined by differential scanning calorimetry (DSC), and has a weight average molecular weight of 40,000 or less, a number average molecular weight of 15,000 or less or a viscosity average molecular weight of 15,000 or less.

* * * * *